United States Patent
Gan et al.

(10) Patent No.: US 11,199,614 B1
(45) Date of Patent: Dec. 14, 2021

(54) LIDAR AND IMAGE CALIBRATION FOR AUTONOMOUS VEHICLES

(71) Applicant: Beijing Voyager Technology Co., Ltd, Beijing (CN)

(72) Inventors: Lingwen Gan, Sunnyvale, CA (US); Zhen Wang, Mountain View, CA (US)

(73) Assignee: Beijing Voyager Technology Co., Ltd, Beijing (CN)

( * ) Notice: Subject to any disclaimer, the term of this patent is extended or adjusted under 35 U.S.C. 154(b) by 0 days.

(21) Appl. No.: 16/924,000

(22) Filed: Jul. 8, 2020

(51) Int. Cl.
| | |
|---|---|
| G01S 7/497 | (2006.01) |
| G01S 17/86 | (2020.01) |
| G01S 17/931 | (2020.01) |
| G01S 17/42 | (2006.01) |
| G06T 7/80 | (2017.01) |
| H04N 5/247 | (2006.01) |
| G06T 7/70 | (2017.01) |

(52) U.S. Cl.
CPC ............ *G01S 7/4972* (2013.01); *G01S 17/42* (2013.01); *G01S 17/86* (2020.01); *G01S 17/931* (2020.01); *G06T 7/70* (2017.01); *G06T 7/80* (2017.01); *H04N 5/247* (2013.01); *G06T 2207/10028* (2013.01); *G06T 2207/30244* (2013.01); *G06T 2207/30252* (2013.01)

(58) Field of Classification Search
CPC ........ G01S 7/4972; G01S 17/86; G01S 17/42; G01S 17/931; G06T 7/70; G06T 7/80; G06T 2207/10028; G06T 2207/30244; G06T 2207/30252; H04N 5/247
See application file for complete search history.

(56) References Cited

U.S. PATENT DOCUMENTS

| | | |
|---|---|---|
| 9,201,424 B1 | 12/2015 | Ogale |
| 10,726,579 B1* | 7/2020 | Huang .................... G01S 17/42 |
| 10,859,684 B1* | 12/2020 | Nabatchian ............... G06T 7/80 |
| 2019/0011927 A1 | 1/2019 | Mou |
| 2019/0012808 A1 | 1/2019 | Mou |
| 2020/0394445 A1* | 12/2020 | Han ................... G06K 9/00791 |

FOREIGN PATENT DOCUMENTS

| | | |
|---|---|---|
| KR | 20180055292 A | 5/2018 |
| KR | 101909953 B1 | 12/2018 |

OTHER PUBLICATIONS

International Search Report and Written Opinion for PCT/US2021/040741, dated Oct. 27, 2021, 9 pages.

* cited by examiner

*Primary Examiner* — Girumsew Wendmagegn
(74) *Attorney, Agent, or Firm* — Kilpatrick Townsend & Stockton LLP (57) ABSTRACT

A coordinate system of a camera of an autonomous vehicle is calibrated to a coordinate system of a LIDAR module using the hand eye equation. However, traditional solutions to the hand eye equation are based on robust rotation about three axes. While calibrating a camera of a car, there is usually robust rotation about only one axis. Degeneracy in rotation about two axes makes the traditional hand eye equation challenging to solve. A rotation vector is defined that has a scaling value. By using the rotation vector, the hand eye equation can be solved to calibrate a pose of the camera to a pose of the LIDAR module.

20 Claims, 7 Drawing Sheets

LIDAR AND IMAGE CALIBRATION FOR AUTONOMOUS VEHICLES

BACKGROUND

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc.

Modern vehicles are often fitted with a suite of environment detection sensors that are designed to detect objects and landscape features around the vehicle in real-time that can be used as a foundation for many present and emerging technologies such as lane change assistance, collision avoidance, and autonomous driving capabilities. Some commonly used sensing systems include optical sensors (e.g., infra-red, cameras, etc.), radio detection and ranging (RADAR) for detecting presence, direction, distance, and speeds of other vehicles or objects, magnetometers (e.g., passive sensing of large ferrous objects, such as trucks, cars, or rail cars), and light detection and ranging (LIDAR).

LIDAR typically uses a pulsed light source and detection system to estimate distances to environmental features (e.g., vehicles, structures, etc.). In some systems, a laser or burst of light (pulse) is emitted and focused through a lens assembly and a reflection of the pulse off of an object is collected by a receiver. A time-of-flight (TOF) of the pulse can be measured from the time of emission to the time the reflection is received and/or phase differences can be calculated, which may manifest as a single data point. This process can be repeated very rapidly over any desired range (typically 360 degrees over a 2D plane for ground-based vehicles, and a 3D region for aircraft) to form a collection of points that are dynamically and continuously updated in real-time, forming a "point cloud." The point cloud data can be used to estimate, for example, a distance, dimension, and location of the object relative to the LIDAR system, often with very high fidelity (e.g., within 5 cm).

Despite the promise that LIDAR and other sensing systems bring to the continued development of fully autonomous transportation, there are challenges that limit its widespread adoption. LIDAR systems are often expensive, large, and bulky. In some cases, multiple emitters may be needed to accurate track a scene, particularly for systems that require accuracy over a large range and field-of-view (FOV). While significant strides have been made to push autonomous vehicle technology to greater commercial adoption, more improvements are needed.

BRIEF SUMMARY

In certain embodiments, a method for calibrating a camera with a LIDAR system without using a specialized target is disclosed.

In certain embodiments, a system for calibrating a visual device with a distance-measuring dimensional device comprises a scanner (e.g., a LIDAR module), a camera comprising one or more image sensors; and one or more processors. The one or more processors are configured to acquire a first image using the camera; calculate a first pose of the camera based on the first image; acquire a second image using the camera; calculate a second pose of the camera based on the second image; calculate a first change in pose based on the first pose of the camera and the second pose of the camera; generate a first three-dimensional plot of a scene using a LIDAR module; calculate a first pose of the LIDAR module based on the first three-dimensional plot of the scene; generate a second three-dimensional plot of the scene using the LIDAR module; calculate a second pose of the LIDAR module based on the second three-dimensional plot of the scene; calculate a second change in pose based on the first pose of the LIDAR module and the second pose of the LIDAR module; relate a rotation of the first change in pose to a rotation of the second change in pose using a rotation vector; define a scaled rotation vector based on an initial value of the scaled rotation vector plus a scaling value; apply an analysis, on a relationship between the first change in pose, the second change in pose, and the scaled rotation vector, to solve for a rotation between the first pose of the camera and the first pose of the LIDAR module; and/or calibrate the camera with the LIDAR module based on the rotation between the first pose of the camera and the first pose of the LIDAR module. In some embodiments, the LIDAR module is mounted on a vehicle; relative motion and rotation between the camera and the LIDAR module are blocked; the scaling value is multiplied by a sum of the rotation of the first change in pose and the rotation of the second change in pose, before adding the scaling value to the initial value of the scaled rotation vector; and/or the analysis is a least-squares analysis.

In certain embodiments, a method for calibrating a visual device with a distance-measuring dimensional device comprises acquiring a first image using a camera; calculating a first pose of the camera based on the first image; acquiring a second image using the camera; calculating a second pose of the camera based on the second image; calculating a first change in pose based on the first pose of the camera and the second pose of the camera; generating a first three-dimensional plot of a scene using a scanner; calculating a first pose of the scanner based on the first three-dimensional plot of the scene; generating a second three-dimensional plot of the scene using the scanner; calculating a second pose of the scanner based on the second three-dimensional plot of the scene; calculating a second change in pose based on the first pose of the scanner and the second pose of the scanner; relating a rotation of the first change in pose to a rotation of the second change in pose using a rotation vector; defining a scaled rotation vector based on an initial value of the scaled rotation vector plus a scaling value; applying an analysis, on a relationship between the first change in pose, the second change in pose, and the scaled rotation vector, to solve for a rotation between the first pose of the camera and the first pose of the scanner; and/or calibrating the camera with the scanner based on the rotation between the first pose of the camera and the first pose of the scanner. In some embodiments, motion of the camera and the scanner is limited to a plane, so that a rotation about a first axis is much greater than a rotation about a second axis; the second axis is orthogonal to the first axis; rotation about the first axis is more than double a rotation about the second axis; motion of the camera and the scanner is from a vehicle driving on flat ground; the method comprises simultaneously calibrating four or more cameras with the scanner, solving for a scaling value to solve for the rotation between the first pose of the camera and the first pose of the scanner, and/or syncing a time of the first change in pose with the second change in pose; the scaling value is multiplied by a sum of the rotation of the first change in pose and the rotation of the second change in pose, before adding the scaling value to the initial value of the scaled rotation vector; the analysis is a least-squares analysis; and/or the scanner is part of a LIDAR module.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The detailed description is set forth with reference to the accompanying figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Aspects of the present disclosure relate generally to calibrating two optical systems. More specifically, and without limitation, this disclosure relates to calibrating a camera coordinate system with a LIDAR coordinate system, without using a target, without using human interaction, or without using both a target and human interaction.

For autonomous and/or semi-autonomous vehicles, a coordinate system of a camera has been calibrated to a coordinate system of LIDAR is two ways: 1. target based; and 2. manual. Target-based methods use certain shapes of objects and can usually be executed in only pre-defined locations. Manual methods usually compare LIDAR and camera information in some manner. For example, mutual information or common features are used by a user to manually align a camera image to LIDAR data. Manual methods have not traditionally used a video stream of the camera. Calibrating a camera system to a LIDAR system can be performed at the factory and then at intervals (e.g., once a month) to verify calibration of sensors. Using a target to calibrate coordinate systems can require certain equipment and knowledge of calibration. Using a person in the loop can take time and/or introduce human error. Further, some calibration techniques calibrate cameras separately. There exists a need for better processes and/or systems to calibrate a camera coordinate system with a LIDAR coordinate system.

The problem of determining a transformation of a robot and a camera is referred to as the hand eye calibration problem. The hand eye calibration problem takes the matrix form $AX=XB$, where A and B are two systems and X is a transformation (e.g., Roger Y. Ysai and Reimar K. Lenz, "Real Time Versatile Robotics Hand/Eye Calibration using 3D Machine Vision," 1988; and https://en.wikipedia.org/wiki/Hand_eye_calibration_problem, last accessed May 25, 2020). In a camera/LIDAR system, matrix A can be used to represent the change of pose of the camera, matrix B can be used to represent the change of pose of the LIDAR, and matrix X is the relationship between pose of the camera system and pose of the LIDAR system.

In a vehicle, the camera and LIDAR are rigidly coupled so that there is no relative motion or rotation between the camera and LIDAR. The problem with using a traditional hand eye system to calibrate the camera system with the LIDAR system is that change of pose in a vehicle may include rotation about mainly, or only, one axis (e.g., rotation about the Y axis is >>than rotation about the X axis and the Z axis, wherein Y is substantially parallel with the direction of gravity). Having degeneracy in two rotations can make the hand eye problem difficult to solve.

To solve a degeneracy in the hand eye problem, a directional vector with a scaler is used. The directional vector allows solving for rotational values by using least squares fitting. By using a calibration process that is automated, human effort can be reduced (e.g., no calibration board; no environment requirement such as specific targets; normal roads can be used for calibration; etc.).

In some configurations, a targetless method uses a camera video stream instead of extracting some explicit geometry information (e.g., such as like plane and normal directions); runs a SLAM (simultaneous localization and mapping) algorithm to estimate pose change of the camera; uses pose change for calibration (e.g., instead of using just one image); compares the pose change of the camera with a LIDAR pose change (e.g., by hand eye calibration) so that time synchronization is taken care of automatically (e.g., since poses can be relatively easily interpolated within a pose change); and/or can be used with non-rotationally rich motion (e.g., classical hand eye calibration uses rotational rich motion to solve the hand eye equation $AX=XB$).

In the following description, various examples of calibrating two local coordinate systems will be described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
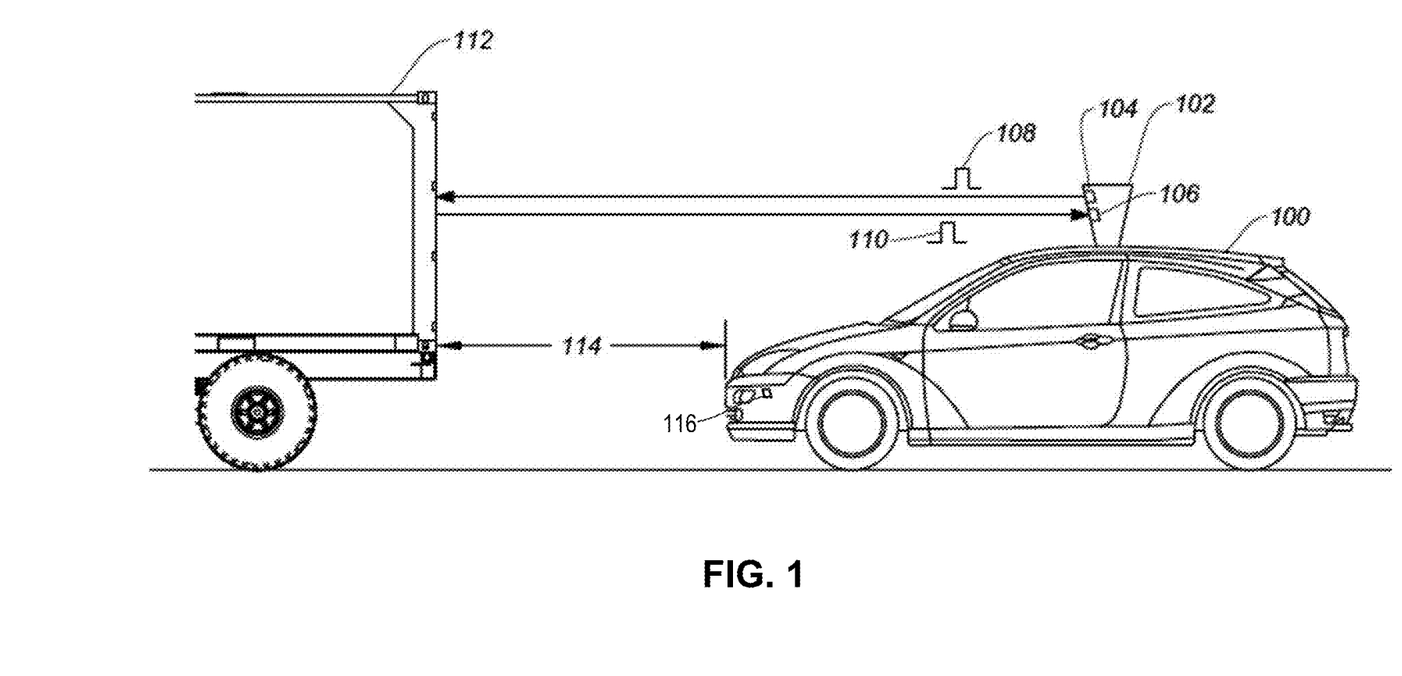
FIG. 1 shows an autonomous driving vehicle utilizing aspects of certain embodiments of disclosed techniques.

FIG. 1 illustrates an embodiment of a vehicle 100 (e.g., an autonomous vehicle, or a vehicle comprising a driver) in which the disclosed techniques can be implemented. The vehicle 100 includes a LIDAR module 102. LIDAR module 102 allows the vehicle 100 to perform object detection and ranging in a surrounding environment. Based on results of object detection and ranging, the vehicle 100 can maneuver to avoid a collision with objects. The LIDAR module 102 can include a transmitter 104 (e.g., a laser) and a receiver 106 (e.g., a detector) for light steering. The transmitter 104 can project one or more light pulses 108 at various directions at different times in a scanning pattern, while receiver 106 can monitor for a light pulse 110 which is generated by the reflection of light pulse 108 by an object. LIDAR module 102 can detect the object based on the reception of light pulse 110, and can perform a ranging determination (e.g., a distance of the object) based on a time difference between light pulses 108 and 110 and/or based on phase difference between light pulses 108 and 110. For example, as shown in FIG. 1, the LIDAR module 102 can transmit light pulse 108 at a direction directly in front of vehicle 100 and receive light pulse 110 reflected by an object 112 (e.g., another vehicle). Based on the reception of light pulse 110, LIDAR module 102 can determine that object 112 is directly in front of vehicle 100. By transmitting and detecting many light pulses per second, the LIDAR module 102 can generate a point cloud that is a three-dimensional representation of objects 112 in an environment. Moreover, based on the time difference between light pulses 108 and 110, LIDAR module 102 can also determine a distance 114 between vehicle 100 and object 112. The vehicle 100 can adjust its speed (e.g., slowing or stopping) to avoid collision with object 112 based on the detection and ranging of object 112 by LIDAR module 102.

The vehicle 100 further comprises a camera 116. The camera 116 is configured to acquire a plurality of images of a scene using an image sensor. The image sensor is sensitive to visible light. The camera 116 can be part of the LIDAR module 102 or separate from the LIDAR module 102. The camera 116 can be used to acquire images for image analysis and/or to display to a user of the vehicle, someone viewing remotely, or someone viewing after a drive has been finished. In some embodiments, there are multiple cameras 116 integrated with the vehicle 100 (e.g., 2, 3, 4, 5, 10 or more cameras).

Figure 2:
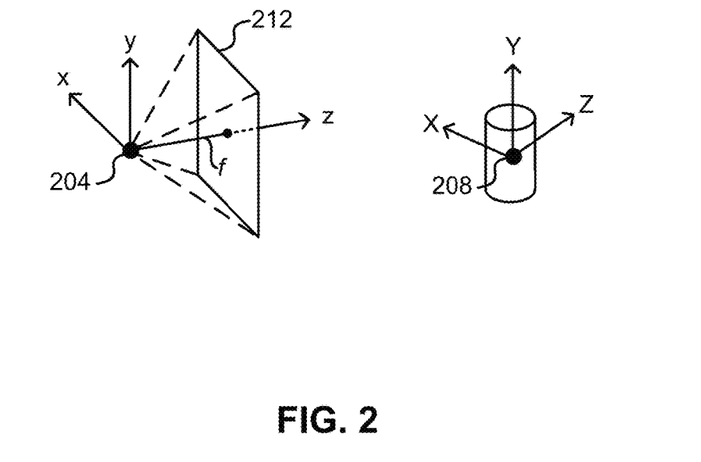
FIG. 2 illustrates a center of a camera and a center of a LIDAR.

FIG. 2 illustrates an embodiment of a center of a camera and a center of a LIDAR. FIG. 2 depicts a camera center 204 and a LIDAR center 208. The camera center 204 is defined is a first local coordinate system (x, y, z). The LIDAR center 208 is defined in a second local coordinate system (X, Y, Z).

The camera center 204 can be defined by the z axis passing through a center of an image sensor 212 of the camera, wherein the z axis is normal to the image sensor 212, the z axis passes through a center of the image sensor 212, the camera center 204 is a distance f from the image sensor 212, and/or the distance f is the focal length of the camera lens. Thus the image sensor 212 acquires images in an x/y plane. The camera center 204 is a center of the camera 116 in FIG. 1.

The LIDAR center 208 can also be the local coordinate system of a car that the LIDAR system is part of. The Y axis can be thought of as the vertical axis of the car (e.g., the Y axis parallel with the direction of gravity while the car is on a level surface). As the car turns on a level surface, the LIDAR rotates about the Y axis. The Z axis of the LIDAR center 208 is a direction that a front of the car is pointed, in some embodiments. The LIDAR center 208 is the center of the LIDAR module 102 in FIG. 1.

In this description, position of the camera center 204 and position of the LIDAR center 208 are measured in three degrees of translational freedom. For example, if the car moved 5 meters forward, then the LIDAR center 208 would move 5 meters in the Z direction. Orientation of the camera center 204 and orientation of the LIDAR center 208 are measured in three degrees of rotational freedom. For example, orientation is measured as roll, pitch, and yaw, wherein roll is rotation about the z axis for the camera center 204 and rotation about the Z axis for the LIDAR center 208; pitch is rotation about the x axis for the camera center 204 and about the X axis for the LIDAR center 208; and yaw is rotation about the y axis for the camera center 204 and about the Y axis for the LIDAR center 208. Pose of the camera and pose of the LIDAR are measured in six degrees of freedom, wherein pose is a combination of three degrees of freedom of position and three degrees of freedom of orientation. Though examples of position, orientation, and pose are given in Cartesian coordinates, other coordinate systems could be used (e.g., spherical or cylindrical coordinates; the camera pose could be defined in Cartesian coordinates and the LIDAR could be defined in cylindrical coordinates).

Figure 3:
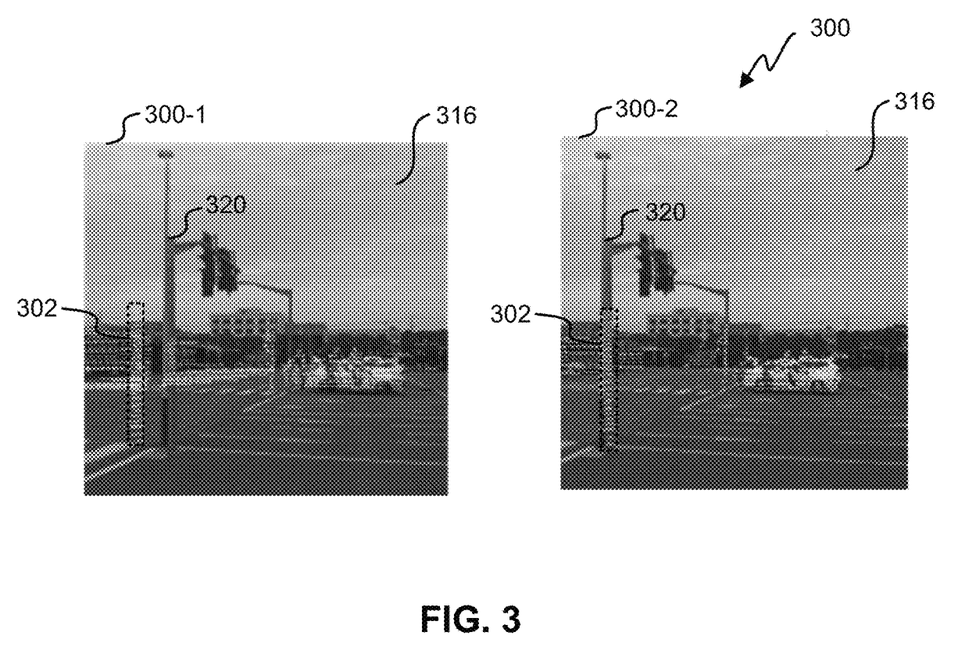
FIG. 3 depicts a misalignment of a camera with LIDAR and alignment of the camera with LIDAR.

FIG. 3 depicts a first frame 300-1 and a second frame 300-2 of an embodiment of LIDAR data 302 (e.g., from a point cloud generated by LIDAR module 102 in FIG. 1) overlaid on an image 316 (e.g., one of a plurality of images acquired by camera 116 of FIG. 1). In the first frame 300-1, the LIDAR data 302 is misaligned with the image 316. For example, the LIDAR data 302 corresponds to a position of a pole 320 in the image 316, however, the LIDAR data 302 is not aligned with the pole 320 in the image 316 of the first frame 300-1.

In the second frame 300-2, the LIDAR data 302 is properly aligned with the image 316. For example, the LIDAR data 302 that corresponds to the position of the pole 320 is aligned with the pole 320. The LIDAR data 302 is properly aligned with the image by calibrating the camera center 204 to the LIDAR center 208 of FIG. 2.

Figure 4:
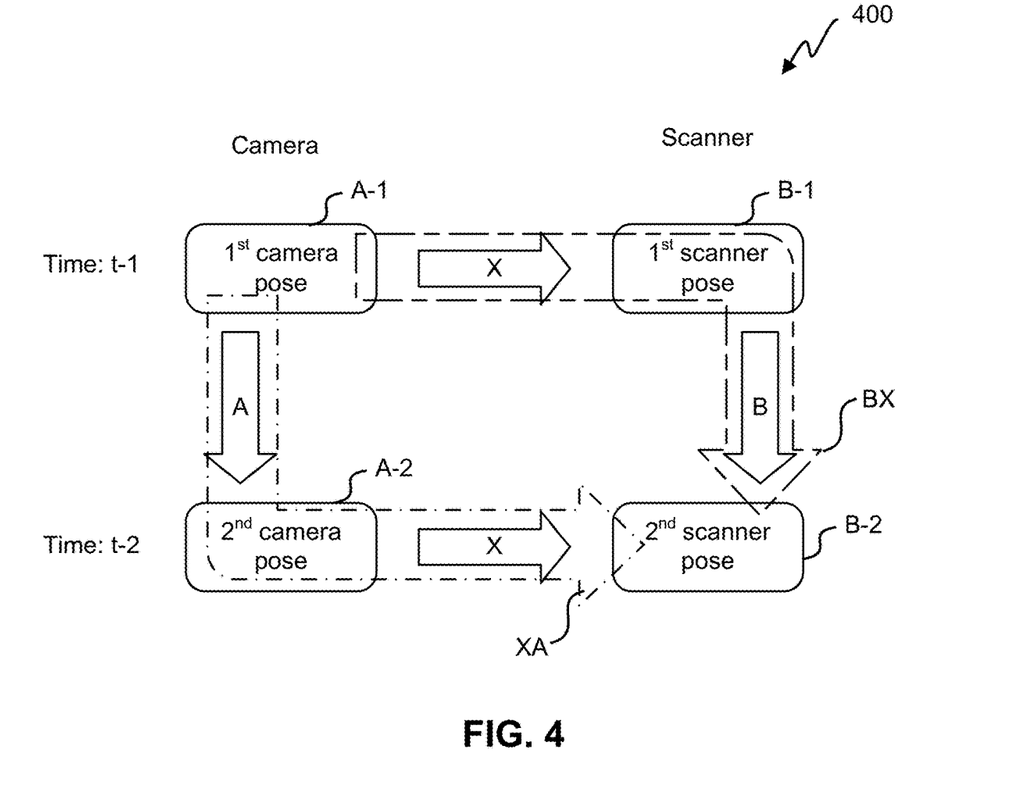
FIG. 4 illustrates a flow diagram of alignment calculations.

FIG. 4 illustrates a flow diagram 400 of an embodiment of alignment calculations for aligning camera with LIDAR. In some embodiments, a camera is aligned with a coordinate system with a car (e.g., a LIDAR system is already calibrated with a coordinate system of a vehicle), and/or the camera is aligned with the LIDAR by aligning both the camera and the LIDAR to a common reference frame (e.g., the vehicle). Though aligning a camera with a LIDAR system is described, this description can be applicable to aligning other coordinate systems (e.g., camera with an IMU, a first camera to a second camera, a first LIDAR system to a second LIDAR system, a LIDAR system to an IMU, and/or a first IMU to a second IMU).

In some embodiments, a calibration technique is accurate, automatic, and/or can calibrate multiple cameras simultaneously by solving a hand eye problem as shown in FIG. 4. In FIG. 4, a change in a coordinate system of a camera (e.g., camera 116 in FIG. 1) is compared to a change in a coordinate system of a scanner (e.g., LIDAR module 102). The camera comprises an image sensor (e.g., image sensor 212 in FIG. 2). The scanner comprises a laser and a detector (e.g., transmitter 104 and receiver 106 in FIG. 1). The camera and the scanner are integrated with a vehicle (e.g., vehicle 100 in FIG. 1) so that there is no relative movement between the camera and the scanner. The camera acquires a plurality of images using the image sensor, including a first image and a second image. The first image is acquired at a first time t−1, and the second image is acquired at second time t−2. The scanner generates a plurality of point clouds, including a first point cloud and a second point cloud. A point cloud is a three-dimensional plot of a scene. The first point cloud is generated at the first time t−1 and the second point cloud generated at the second time t−2. In some embodiments, the second point cloud includes one or more data points calculated during the first time t−1.

A first pose of the camera A−1 is calculated based on the first image. A second pose of the camera A−2 is calculated based on the second image. Transformation A, a change in pose of the camera (sometimes referred to a first change in pose), is calculated based on the first pose of the camera A−1 and the second pose of the camera A−2. Transformation A is a transformation from the first pose of the camera A−1 to the second pose of the camera A−2.

A first pose of the scanner B−1 is calculated based on the first point cloud. A second pose of the scanner B−2 is calculated based on the second point cloud. Transformation B, a change in pose of the scanner (sometimes referred to as a second change in pose), is calculated based on the first pose of the scanner B−1 and the second pose of the scanner B−2. Transformation B is a transformation from the first pose of the scanner B−1 to the second pose of the scanner B−2. Transformation X is a difference of pose between the camera and the scanner. Transformations A, B, and X are matrices containing information about rotation and translation.

The first change in pose, transformation A, is synced in time with the second change in pose, transformation B (e.g., using the first time t−1 and the second time t−2). Transformations A, B, and X are related by the equation: XA=BX. In some embodiments, transformation A is calculated, transformation B is calculated, and then transformation X is solved for by using the equation XA=BX.

Transformation A can be calculated using a visual SLAM algorithm. However, monocular visual slam can be difficult to solve for. SLAM can be divided into two parts, initialization and tracking. In some embodiments, to calculate transformation A, one or more of the following are used for initialization: extract features with descriptors (e.g., cv:: goodFeaturesToTrack (e.g., see https://docs.opencv.org/2.4/ modules/imgproc/doc/feature detection.html#goodfeaturestotrack)+BRIEF descriptor); match feature descriptors (lowes ratio+bidirectional+max distance); estimate pose (cv:findEssentialMat+minimize symmetric epipolar distance); triangulate (cv::triangulate-Point+min disparity); and/or drop if low quality (points with big disparity >failed+points with small disparity). In some embodiments, to calculate transformation A, one or more of the following are used for tracking: match with ref frame (lowes ratio+bidirectional+max distance); estimate pose (minimize reprojection loss); skip if not keyframe (small motion && similar to ref); match with prior points (filter gross outliers since init value is obtained); estimate pose (minimize projection loss); and/or triangulate more points (e.g., pick 3 frames with largest covisabilities).

Figure 5:
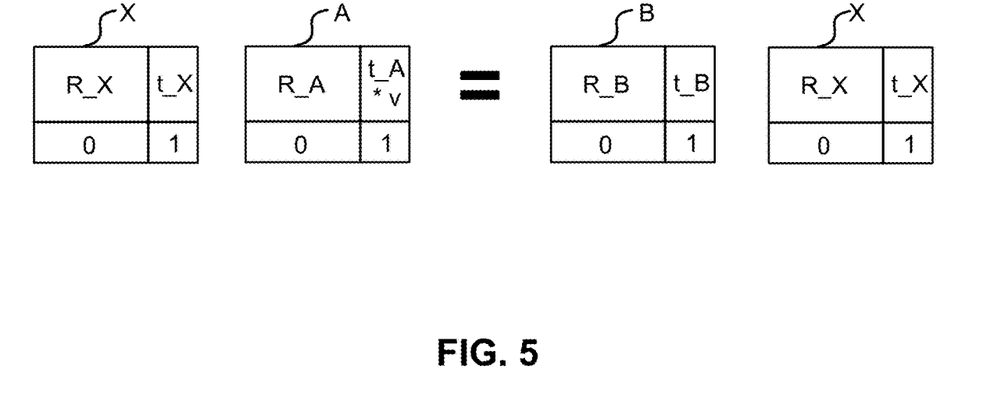
FIG. 5 depicts corresponding matrices.

FIG. 5 depicts corresponding matrices for transformations A, B, and X of FIG. 4 arranged in the equation of XA=BX. One challenge in solving equation XA=BX comes from having degenerate motion. For example, if a car is driving on relatively flat ground, there is rotation about the Y axis and not as much rotation about the X axis or the Z axis (e.g., degenerate in planar motion). Accordingly, rotation about the X and Z axes can be degenerate, which can make solving the equation XA=BX challenging.

As seen in FIG. 5, transformation matrices A, B, and X can be divided into a rotation R component (a 3×3 matrix) and a translation t component (a 3×1 matrix), where R_X is rotation and t_X is translation of the transformation X; R_A is rotation and t_A is translation of the transformation A; and R_B is rotation and t_B is translation of the transformation B. Of note, a scale ambiguity v is multiplied by the translation t_A of transformation A. Scale ambiguity v is used because a monocular camera SLAM does not know a real-world length between two points; instead, the monocular camera SLAM knows relative distances between points. The following equations relate various rotations R and translations t:

$$R\_X * R\_A = R\_B * R\_X \qquad \text{Equation 1:}$$

$$(I - R\_B) * t\_x = t\_B - R\_X * t\_A * v \qquad \text{Equation 2:}$$

Calibrating the camera to the scanner can be performed by calculating R_X and t_X, wherein there is a fixed relative rotation and translation between the camera and the scanner.

Figure 6:
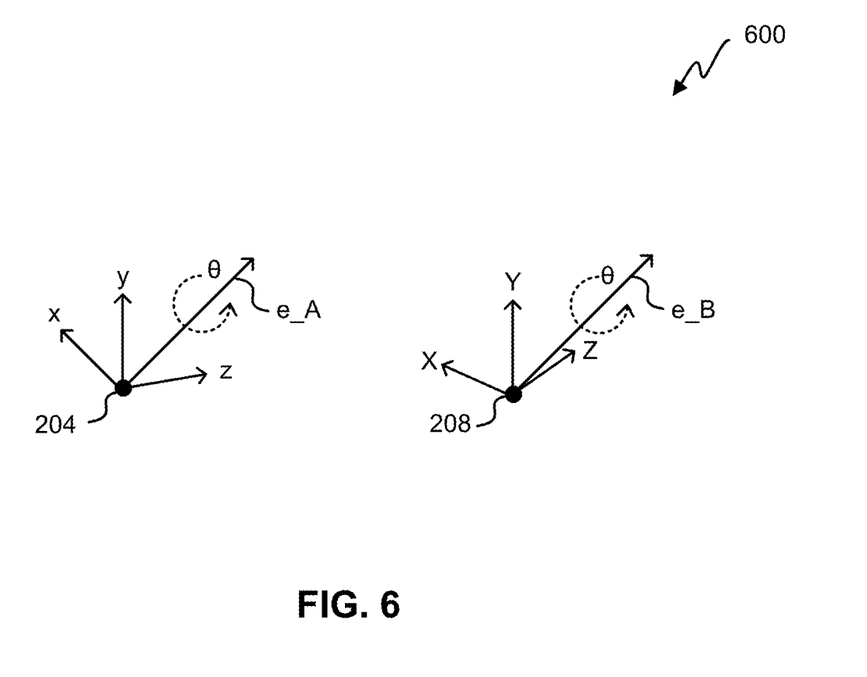
FIG. 6 illustrates a rotation vector in different frames.

FIG. 6 illustrates a rotation vector e in different frames. FIG. 6 depicts the camera center 204 and the LIDAR center 208. In some embodiments, t_X is measured (e.g., measuring an offset of the camera center 204 to the LIDAR center 208). FIG. 6 further shows a rotation vector e_A of transformation A in relation to the camera center 204 and a rotation vector e_B of transformation B in relation to the LIDAR center 208. Since relative motion (rotation and translation) between the camera center 204 and the LIDAR center 208 is fixed, both e_A and e_B have the same rotation of 0, and Equation 1 can be rewritten as:

$$e\_B = R\_X * e\_A \qquad \text{Equation 3:}$$

Equation 3 relates rotation of the first change in pose to rotation of the second change in pose using the rotation vector R_X, where the rotation vector R_X is a rotation difference between the coordinate system of the camera and the coordinate system of the scanner. Further:

$$(e\_A + e\_B) \times e\_X = e\_A - e\_B, \qquad \text{Equation 4:}$$

where (e_A+e_B) is a rank 2; and $$e\_X = e\_0 + u * (e\_A + e\_B). \qquad \text{Equation 5:}$$

In Equation 5, e_X is a scaled rotation vector based on an initial value of the rotation vector e_0 plus a scaling value u multiplying the sum of the rotation of the first pose e_A and the rotation of the second pose e_B. The scaling value u is a 1 degree of freedom in rotation.

By combining Equation 5 with Equation 2 yields:

$$(I - R\_B) * t = t\_B - v * R\_X(u) * t\_A, \qquad \text{Equation 6:}$$

wherein R_X is a function of the scaling value u.

Equation 6 is a nonlinear equation that can be solved by applying a non-linear least squares fit analysis to solve for u (scaling value) and R_X (rotation vector between the first pose of the camera and the first pose of the LIDAR system). For example, the non-linear least squares fit is used to minimize a residual to get u and therefore R_X.

In some embodiments, scale ambiguity v can be estimated (e.g., for setting an initial condition for the scale ambiguity v). In a first example for estimating the scale ambiguity v, a height of a camera above ground is known (e.g., 1.5 meters). A point cloud is generated from camera SLAM. A ground detection algorithm is run (e.g., a plane fitting for points that have smaller y in the coordinate system), which can provide a ground height without scale (e.g., ground height is normalized to 1.0). Using the known height can provide an estimate for the scale for the ground height (e.g., 1.0=1.5 meters).

In a second example for estimating the scale ambiguity v, a vehicle moves in a straight line. A LIDAR module can report a moving distance (e.g., 3 meters). The camera SLAM will also report a moving distance (e.g., normalized to 1.0). The moving distance of the LIDAR module is used to provide an estimate of scale for the scale ambiguity of the camera SLAM (e.g., 1.0=3 meters). Applicant has found that the second example is more robust in certain situations.

Figure 7:
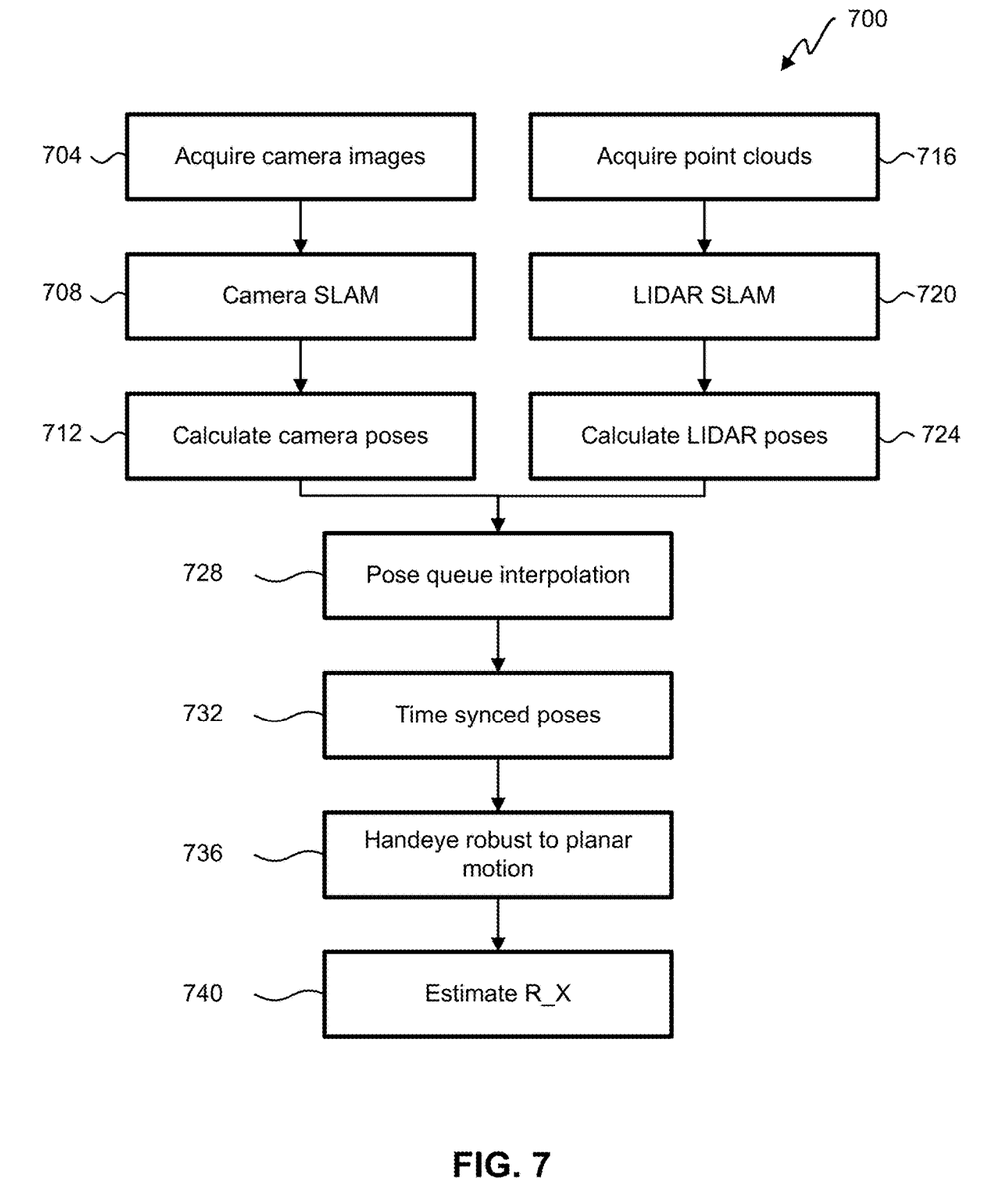
FIG. 7 illustrates a flowchart of an embodiment of a method of estimating a rotation vector used for calibrating a camera system with a LIDAR system.

FIG. 7 illustrates a flowchart of an embodiment of a process 700 of estimating rotation for calibrating a camera system with a LIDAR system. Process 700 begins with step 704 in acquiring a plurality of images. The plurality of images are acquired by one or more cameras 116 in FIG. 1. In step 708, a SLAM algorithm is run on the plurality of images. Some example SLAM algorithm steps are given in the description of FIG. 4. In step 712, camera poses are calculated. For example, the first camera pose A-1 and the second camera pose A-2 in FIG. 4 are calculated based on running the SLAM algorithm on the plurality of images.

In step 716, a plurality of point clouds are acquired. The plurality of point clouds can be acquired using the LIDAR module 102 of FIG. 1. A LIDAR SLAM algorithm is run on the plurality of point clouds, step 720, and LIDAR poses are calculated in step 724. For example, the first scanner pose B-1 and the second scanner pose B-2 are calculated based on running the LIDAR SLAM algorithm on the plurality of point clouds. In some embodiments, steps 716, 720, and 724 are performed concurrently with steps 704, 708, and 712. In some embodiments, steps 704, 708, and 712 (along with steps 716, 720, 724) are repeated based on video images.

In step 728, pose queue interpolation is performed. A pose can be interpolated from a first pose at a first time and a second pose at a second time, wherein the interpolation provides a pose between the first time and the second time (e.g., using a spline interpolation, https://math.stackexchange.com/questions/2092456/spline-interpolation-in-se3). Poses (e.g., poses A-1 and B-1; and A-2 and B-2) are time synced, step 732. In step 736, the equation XA=BX is solved for degenerate motion (e.g., see FIGS. 5 and 6 and accompanying descriptions for solving XA=BX for a car moving in a plane). From solving equation XA=BX, a rotation vector R_X is estimated, step 740, which indicates how a camera center and a LIDAR center are related in three degrees of rotational freedom. A distance between the camera center and the LIDAR center (e.g., t_X) can be measured (e.g., with a ruler or electronic measuring device) in three degrees of translational freedom.

Figure 8:
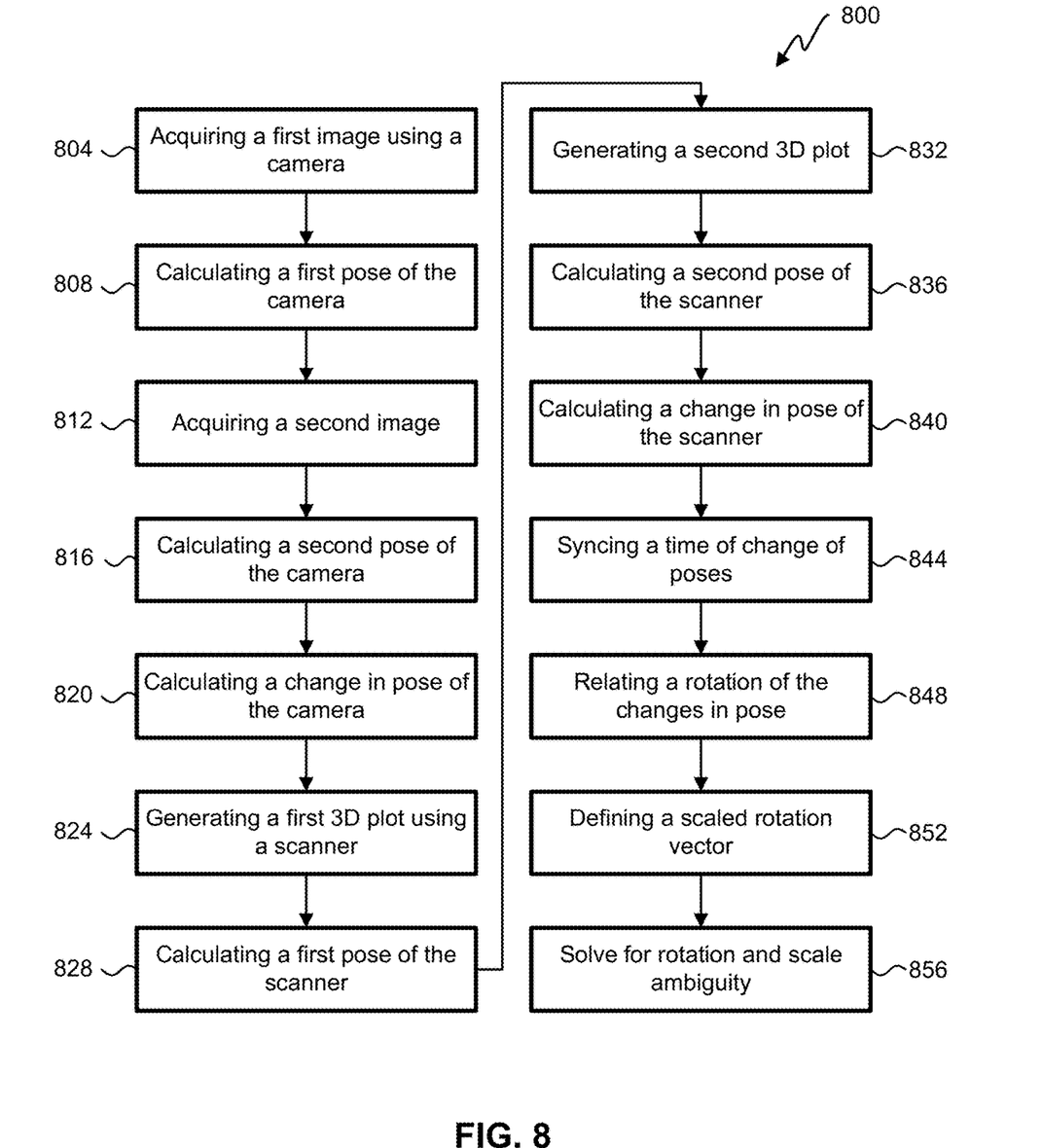
FIG. 8 illustrates a flowchart of an embodiment of a method for calibrating a camera system with a LIDAR system.

FIG. 8 illustrates a flowchart of an embodiment of a process 800 for calibrating a camera with a scanner. Process 800 begins with step 804 in acquiring a first image using a camera. For example, the first image is acquired by the camera 116 of FIG. 1. A first pose of the camera (e.g., first pose A-1 in FIG. 4) is calculated based on the first image, step 808. For example, a SLAM algorithm is used to calculate the first pose of the camera. A second image is acquired by the camera, step 812, and a second pose (e.g., second pose A-2 in FIG. 4) of the camera is calculated based on the second image, step 816. A first change in pose (e.g., transformation A in FIG. 4) is calculated based on the first pose of the camera and the second pose of the camera, step 820.

A scanner (e.g., LIDAR module 102 in FIG. 1) is used to generate a first three-dimensional plot of a scene, step 824. From the first three-dimensional plot a first pose (e.g., first pose B-1 in FIG. 4) of the scanner is calculated, step 828. For example a SLAM algorithm is used to calculate the first pose of the scanner based on the first three-dimensional plot. A second three-dimensional plot is generated by the scanner, step 832, and a second pose of the scanner (e.g., B-2 in FIG. 4) is calculated using the second 3D plot, step 836. A second change in pose (e.g., transformation B in FIG. 4) is calculated based on the first pose of the scanner and the second pose of the scanner, step 840. Steps 824-840 can be performed concurrently with steps 804-820.

The first change of pose is time synced with the second change of pose, step 844. For example, the first change in pose of the camera and the second change in pose of the scanner are both calculated from time t-1 to time t-2 in FIG. 4. In step 848, rotation of the first change in pose is related to rotation of the second change in pose. For example, $e\_B = R\_X * e\_A$ (Equation 3). A scaled rotation vector is defined in step 852. For example, $e\_X$ (a scaled rotation vector) is a function of an initial value $e\_0$, a scaling value $u$, $e\_A$, and $e\_B$ (Equation 5). In step 856, rotation between the camera and the scanner (e.g., $R\_X$) is solved for as well as the scaling value (e.g., scaling value $u$). For example, Equation 6 is solved for scaling value $u$ and $R\_X(u)$ by applying a nonlinear least squares fit analysis on a relationship between the first change in pose, the second change in pose, and a scaled rotation vector. By solving for rotation $R\_X$ (since $t\_X$ is previously known and/or can be measured), the camera can be calibrated to the scanner.

In some embodiments, motion of the camera and the scanner is limited to a plane, so that rotation about a first axis is much greater than rotation about a second axis. For example, the motion is of a vehicle driving in the X/Z plane so the rotation about Y axis is greater than (e.g., equal to or greater than 2, 5, 10, 15, 20, or 24 times) rotation about the X and/or Z axis. For example, a car can turn 360 degrees about the Y axis and rotate no more than 5, 10, or 15 degrees about the X axis. In some embodiments, flat ground has a slope equal to or less than 1, 2, or 5 degrees. The Y axis is orthogonal to the X axis and to the Z axis. In some embodiments, more than one camera is calibrated to the scanner at one time. For example, two, three, four, or more cameras, integrated with a vehicle, are simultaneously calibrated to the scanner (which is calibrated to the vehicle).

Figure 9:
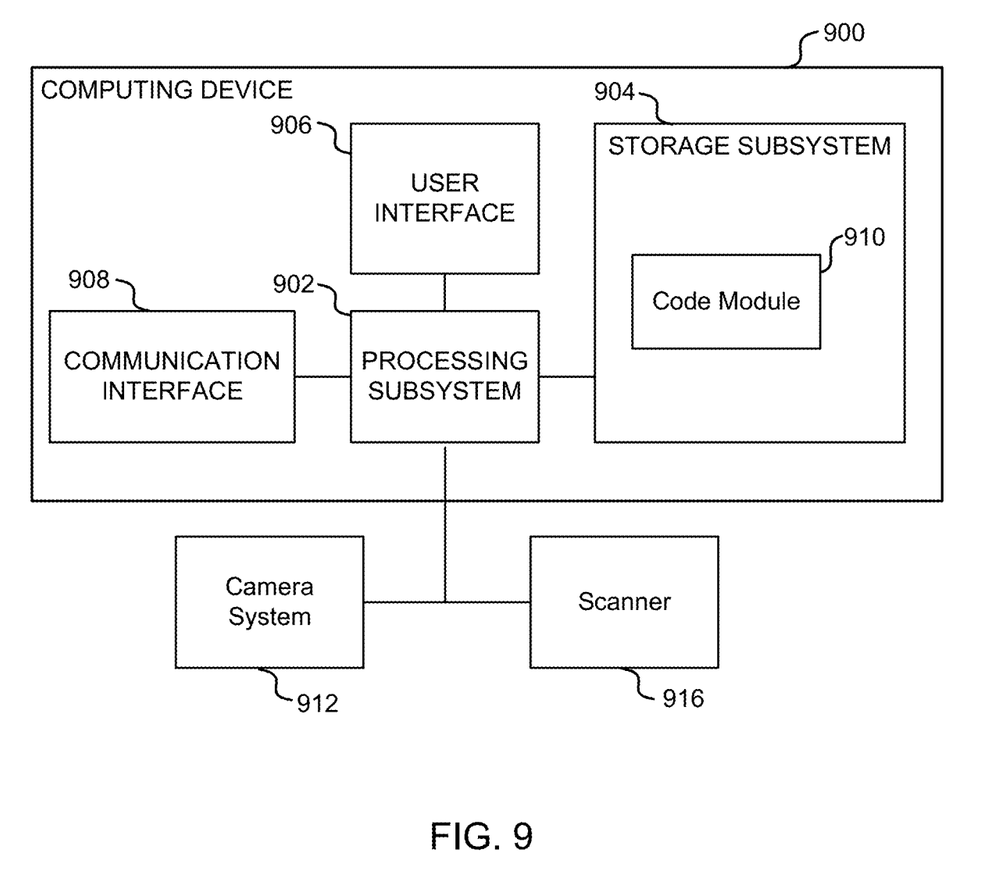
FIG. 9 depicts a block diagram of an embodiment of a computer system interfacing with a camera and a LIDAR system.

FIG. 9 is a simplified block diagram of a computing device 900. Computing device 900 can implement some or all functions, behaviors, and/or capabilities described above that would use electronic storage or processing, as well as other functions, behaviors, or capabilities not expressly described. Computing device 900 includes a processing subsystem 902, a storage subsystem 904, a user interface 906, and/or a communication interface 908. Computing device 900 can also include other components (not explicitly shown) such as a battery, power controllers, and other components operable to provide various enhanced capabilities. In various embodiments, computing device 900 can be implemented in a vehicle, laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 904 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 904 can store one or more applications and/or operating system programs to be executed by processing subsystem 902, including programs to implement some or all operations described above that would be performed using a computer. For example, storage subsystem 904 can store one or more code modules 910 for implementing one or more method steps described above.

A firmware and/or software implementation may be implemented with modules (e.g., procedures, functions, and so on). A machine-readable medium tangibly embodying instructions may be used in implementing methodologies described herein. Code modules 910 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 910) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 910 may comprise sets of instructions (codes) embodied on a computer-readable medium that directs a processor of a computing device 900 to perform corresponding actions. The instructions may be configured to run in sequential order, in parallel (such as under different processing threads), or in a combination thereof. After loading a code module 910 on a general purpose computer system, the general purpose computer is transformed into a special purpose computer system.

Computer programs incorporating various features described herein (e.g., in one or more code modules 910) may be encoded and stored on various computer readable storage media. Computer readable media encoded with the program code may be packaged with a compatible electronic device, or the program code may be provided separately from electronic devices (e.g., via Internet download or as a separately packaged computer-readable storage medium). Storage subsystem 904 can also store information useful for establishing network connections using the communication interface 908.

User interface 906 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 906 to invoke the functionality of computing device 900 and can view and/or hear output from computing device 900 via output devices of user interface 906. For some embodiments, the user interface 906 might not be present (e.g., for a process using an ASIC).

Processing subsystem 902 can be implemented as one or more processors (e.g., integrated circuits, one or more single-core or multi-core microprocessors, microcontrollers, central processing unit, graphics processing unit, etc.). In operation, processing subsystem 902 can control the operation of computing device 900. In some embodiments, processing subsystem 902 can execute a variety of programs in response to program code and can maintain multiple concurrently executing programs or processes. At a given time, some or all of a program code to be executed can reside in processing subsystem 902 and/or in storage media, such as storage subsystem 904. Through programming, processing subsystem 902 can provide various functionality for computing device 900. Processing subsystem 902 can also execute other programs to control other functions of computing device 900, including programs that may be stored in storage subsystem 904.

The processing subsystem 902 is in electronic communication (wired or wireless) with a camera system 912 and a scanner 916. For example, the camera system 912 is the camera 116 in FIG. 1 and the scanner 916 is the LIDAR module 102 in FIG. 1.

Communication interface 908 can provide voice and/or data communication capability for computing device 900. In some embodiments, communication interface 908 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 908 can provide wired connectivity (e.g., universal serial bus, Ethernet, universal asynchronous receiver/transmitter, etc.) in addition to, or in lieu of, a wireless interface. Communication interface 908 can be implemented using a combination of hardware (e.g., driver circuits, antennas, modulators/demodulators, encoders/decoders, and other analog and/or digital signal processing circuits) and software components. In some embodiments, communication interface 908 can support multiple communication channels concurrently. In some embodiments, the communication interface 908 is not used.

It will be appreciated that computing device 900 is illustrative and that variations and modifications are possible. A computing device can have various functionality not specifically described (e.g., voice communication via cellular telephone networks) and can include components appropriate to such functionality.

Further, while the computing device 900 is described with reference to particular blocks, it is to be understood that these blocks are defined for convenience of description and are not intended to imply a particular physical arrangement of component parts. For example, the processing subsystem 902, the storage subsystem 904, the user interface 906, and/or the communication interface 908 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 900.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary.

All patents, patent applications, publications, and descriptions mentioned here are incorporated by reference in their entirety for all purposes. None is admitted to be prior art.

What is claimed is:

1. A system for calibrating a visual device with a distance-measuring dimensional device, the system comprising:
   a LIDAR module;
   a camera comprising one or more image sensors;
   one or more processors configured to:
      acquire a first image using the camera;
      calculate a first pose of the camera based on the first image;
      acquire a second image using the camera;
      calculate a second pose of the camera based on the second image;
      calculate a first change in pose based on the first pose of the camera and the second pose of the camera;
      generate a first three-dimensional plot of a scene using the LIDAR module;
      calculate a first pose of the LIDAR module based on the first three-dimensional plot of the scene;
      generate a second three-dimensional plot of the scene using the LIDAR module;
      calculate a second pose of the LIDAR module based on the second three-dimensional plot of the scene;
      calculate a second change in pose based on the first pose of the LIDAR module and the second pose of the LIDAR module;
      relate a rotation of the first change in pose to a rotation of the second change in pose using a rotation vector;
      define a scaled rotation vector based on an initial value of the rotation vector plus a scaling value;
      apply an analysis on a relationship between the first change in pose, the second change in pose, and the scaled rotation vector to solve for a rotation between the first pose of the camera and the first pose of the LIDAR module; and
      calibrate the camera with the LIDAR module based on the rotation between the first pose of the camera and the first pose of the LIDAR module.

2. The system of claim 1, wherein the LIDAR module is mounted on a vehicle.

3. The system of claim 1, wherein relative motion and rotation between the camera and the LIDAR module are blocked.

4. The system of claim 1, wherein the scaling value is multiplied by a sum of the rotation of the first change in pose and the rotation of the second change in pose, before adding the scaling value to the initial value of the scaled rotation vector.

5. The system of claim 1, wherein the analysis is a least-squares analysis.

6. A method for calibrating a visual device with a distance-measuring dimensional device, the method comprising:
   acquiring a first image using a camera;
   calculating a first pose of the camera based on the first image;
   acquiring a second image using the camera;
   calculating a second pose of the camera based on the second image;

calculating a first change in pose based on the first pose of the camera and the second pose of the camera;
generating a first three-dimensional plot of a scene using a scanner;
calculating a first pose of the scanner based on the first three-dimensional plot of the scene;
generating a second three-dimensional plot of the scene using the scanner;
calculating a second pose of the scanner based on the second three-dimensional plot of the scene;
calculating a second change in pose based on the first pose of the scanner and the second pose of the scanner;
relating a rotation of the first change in pose to a rotation of the second change in pose using a rotation vector;
defining a scaled rotation vector based on an initial value of the rotation vector plus a scaling value;
applying an analysis on a relationship between the first change in pose, the second change in pose, and the scaled rotation vector to solve for a rotation between the first pose of the camera and the first pose of the scanner; and
calibrating the camera with the scanner based on the rotation between the first pose of the camera and the first pose of the scanner.

7. The method of claim 6, wherein:
motion of the camera and the scanner is limited to a plane, so that a rotation about a first axis is much greater than a rotation about a second axis; and
the second axis is orthogonal to the first axis.

8. The method of claim 7, wherein a rotation about the first axis is more than double a rotation about the second axis.

9. The method of claim 7, wherein motion of the camera and the scanner is from a vehicle driving on flat ground.

10. The method of claim 6, further comprising simultaneously calibrating four or more cameras with the scanner.

11. The method of claim 6, further comprising solving for the scaling value to solve for the rotation between the first pose of the camera and the first pose of the scanner.

12. The method of claim 6, further comprising syncing a time of the first change in pose with the second change in pose.

13. The method of claim 6, wherein the scaling value is multiplied by a sum of the rotation of the first change in pose and the rotation of the second change in pose, before adding the scaling value to the initial value of the scaled rotation vector.

14. The method of claim 6, wherein the analysis is a least-squares analysis.

15. The method of claim 6, wherein the scanner is part of a LIDAR module.

16. A memory device having instructions that when executed cause one or more processors to perform the following steps:
acquiring a first image using a camera;
calculating a first pose of the camera based on the first image;
acquiring a second image using the camera;
calculating a second pose of the camera based on the second image;
calculating a first change in pose based on the first pose of the camera and the second pose of the camera;
generating a first three-dimensional plot of a scene using a scanner;
calculating a first pose of the scanner based on the first three-dimensional plot of the scene;
generating a second three-dimensional plot of the scene using the scanner;
calculating a second pose of the scanner based on the second three-dimensional plot of the scene;
calculating a second change in pose based on the first pose of the scanner and the second pose of the scanner;
relating a rotation of the first change in pose to a rotation of the second change in pose using a rotation vector;
defining a scaled rotation vector based on an initial value of the rotation vector plus a scaling value;
applying an analysis on a relationship between the first change in pose, the second change in pose, and the scaled rotation vector to solve for a rotation between the first pose of the camera and the first pose of the scanner; and
calibrating the camera with the scanner based on the rotation between the first pose of the camera and the first pose of the scanner.

17. The memory device of claim 16, wherein the instructions when executed cause the one or more processors to sync a time of the first change in pose with the second change in pose.

18. The memory device of claim 16, wherein the scaling value is multiplied by a sum of the rotation of the first change in pose and the rotation of the second change in pose, before adding the scaling value to the initial value of the scaled rotation vector.

19. The memory device of claim 16, wherein the analysis is a least-squares analysis.

20. The memory device of claim 16, wherein the scanner is part of a LIDAR module.

* * * * *